United States Patent
Gan et al.

(10) Patent No.: US 12,088,648 B2
(45) Date of Patent: Sep. 10, 2024

(54) PRESENTATION OF REMOTELY ACCESSIBLE CONTENT FOR OPTIMIZING TELECONFERENCE RESOURCE UTILIZATION

(71) Applicant: Google LLC, Mountain View, CA (US)

(72) Inventors: Qianjun Gan, Los Angeles, CA (US); Lei Shi, Sunnyvale, CA (US); Yichen Huang, Seattle, WA (US); Aobo Zhou, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/946,704

(22) Filed: Sep. 16, 2022

(65) Prior Publication Data

US 2024/0098123 A1  Mar. 21, 2024

(51) Int. Cl.
*H04L 65/403* (2022.01)
(52) U.S. Cl.
CPC .................. *H04L 65/403* (2013.01)
(58) Field of Classification Search
CPC ..... H04L 65/403; H04L 67/02; G06F 16/954; G06F 2216/15
See application file for complete search history.

(56) References Cited

U.S. PATENT DOCUMENTS 7,149,776 B1 * 12/2006 Roy ...................... G06F 16/954
715/239
8,010,901 B1 * 8/2011 Rogers ...................... G06F 9/54
715/788
8,887,063 B2 * 11/2014 LaBine ................. G06F 3/1454
715/764

(Continued)

FOREIGN PATENT DOCUMENTS

| CN | 114816293 A | * | 7/2022 | |
| CN | 114827102 A | * | 7/2022 | |
| WO | WO-2016024740 A1 | * | 2/2016 | ............. H04L 51/04 |

OTHER PUBLICATIONS

Why do access tokens expire?, retrived from—https://stackoverflow.com/questions/7030694/why-do-access-tokens-expire, Aug. 12, 2011, 6 pages (Year: 2011).*

(Continued)

*Primary Examiner* — Yongjia Pan
(74) *Attorney, Agent, or Firm* — DORITY & MANNING P.A.

(57) ABSTRACT

Systems and methods of the present disclosure include a method for increasing teleconferencing bandwidth efficiency via presentation of remotely accessible content. The method includes receiving a request to present content to a teleconference from a presenting participant device of the teleconference. The method includes generating a unit of software instructions that is configured to cause a participant device to access the content from an originating location that differs from the presenting participant device, and display the content within a shared content interface of the teleconference configured to display a view of the content that is consistent between each participant device of the teleconference. The method includes providing the unit of software instructions to one or more non-presenting participant devices of the teleconference.

15 Claims, 6 Drawing Sheets

(56) References Cited

U.S. PATENT DOCUMENTS

| | | | | |
|---|---|---|---|---|
| 9,225,768 | B2* | 12/2015 | Kakishay | H04L 67/04 |
| 9,462,017 | B1* | 10/2016 | Siracusano, Jr. | H04L 65/4015 |
| 9,547,631 | B1* | 1/2017 | Chitta | G06F 3/1454 |
| 9,686,366 | B2* | 6/2017 | Bank | H04L 67/14 |
| 10,306,021 | B1* | 5/2019 | Mamtani | H04L 67/01 |
| 11,349,889 | B1* | 5/2022 | Ashkenazi | H04L 12/1813 |
| 11,349,892 | B2* | 5/2022 | Cen | H04N 21/6582 |
| 2002/0059308 | A1 | 5/2002 | Kawashima et al. | |
| 2002/0184312 | A1* | 12/2002 | Chen | G06F 16/538 |
| | | | | 709/205 |
| 2003/0023679 | A1 | 1/2003 | Johnson et al. | |
| 2004/0225716 | A1* | 11/2004 | Shamir | H04L 67/52 |
| | | | | 709/204 |
| 2009/0164581 | A1* | 6/2009 | Bove | G06F 16/954 |
| | | | | 709/205 |
| 2009/0249244 | A1* | 10/2009 | Robinson | G06F 3/0481 |
| | | | | 715/781 |
| 2011/0289157 | A1* | 11/2011 | Pirnazar | H04L 51/52 |
| | | | | 709/227 |
| 2012/0054640 | A1* | 3/2012 | Nancke-Krogh | G06F 9/4843 |
| | | | | 715/751 |
| 2012/0317487 | A1* | 12/2012 | Lieb | G06F 40/169 |
| | | | | 715/730 |
| 2013/0110937 | A1 | 5/2013 | Burns et al. | |
| 2014/0006915 | A1* | 1/2014 | Bank | G06F 16/954 |
| | | | | 715/205 |
| 2014/0047356 | A1* | 2/2014 | Ameller-Van-Baumberghen (a.k.a. Rafael Ameller) | H04L 65/403 |
| | | | | 715/753 |
| 2014/0156756 | A1 | 6/2014 | Ding et al. | |
| 2015/0020151 | A1 | 1/2015 | Ramanathan | |
| 2015/0058407 | A1* | 2/2015 | Uhma | G06F 16/972 |
| | | | | 709/203 |
| 2015/0149504 | A1* | 5/2015 | Sosna | H04L 12/1818 |
| | | | | 707/770 |
| 2016/0050263 | A1* | 2/2016 | Hwang | H04N 21/234363 |
| | | | | 709/204 |
| 2016/0285928 | A1 | 9/2016 | Sanso et al. | |
| 2019/0273734 | A1* | 9/2019 | Thakkar | H04L 9/088 |
| 2020/0106813 | A1 | 4/2020 | Vendrow et al. | |
| 2020/0356221 | A1 | 11/2020 | Behzadi et al. | |
| 2021/0373741 | A1 | 12/2021 | Agarawala et al. | |
| 2022/0278992 | A1* | 9/2022 | Baker | H04L 63/105 |
| 2022/0417298 | A1* | 12/2022 | Vaid | G06F 16/954 |
| 2023/0010127 | A1* | 1/2023 | Elsner | H04L 12/1813 |

OTHER PUBLICATIONS

"Google Meet Adds New Whiteboard Tool with Third-Party 'Miro'", retrieved Oct. 17, 2022, 10 pages.

"HTML <iframe> Tag", https://www.w3schools.com/tags/tag_iframe. ASP, retrieved Oct. 17, 2022, 9 pages.

"Share Content in a Meeting in Teams", https://support.microsoft.com/en-us/office/share-content-in-a-meeting-in-teams-fcc2bf59-aecd-4481-8f99-ce55dd836ce8, retrieved Oct. 17, 2022, 7 pages.

International Search Report and Written Opinion for PCT/US2023/022244, mailed on Sep. 21, 2023, 20 pages.

* cited by examiner

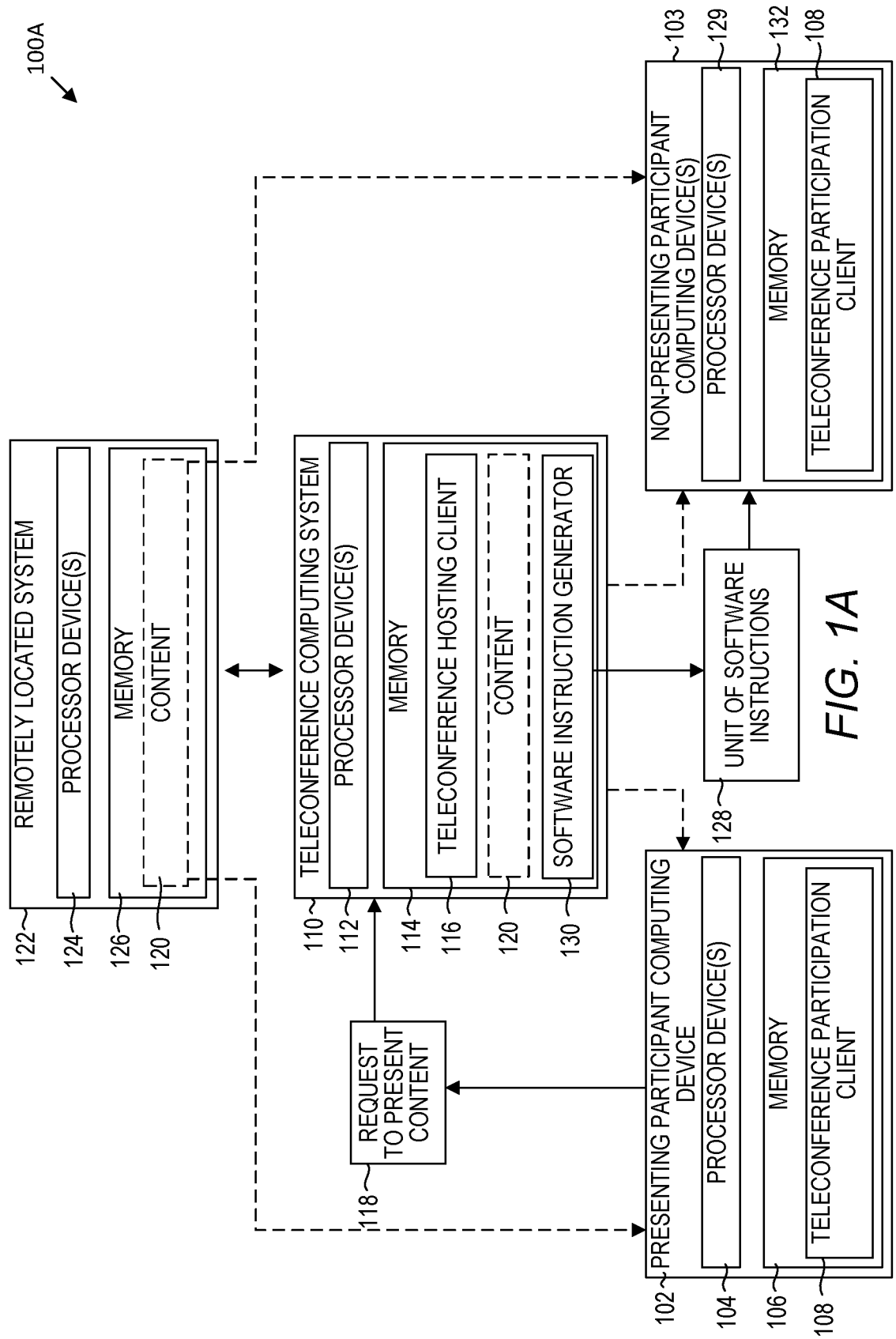

PRESENTATION OF REMOTELY ACCESSIBLE CONTENT FOR OPTIMIZING TELECONFERENCE RESOURCE UTILIZATION

FIELD

The present disclosure relates generally to presentation of remotely accessible content. More particularly, the present disclosure relates to presentation of remotely accessible content within a shared content interface of a teleconference.

BACKGROUND

Teleconferencing (e.g., audioconferencing, videoconferencing, multimedia conferencing, etc.) allows multiple participants to exchange communication data in real-time (e.g., audio data, video data, Augmented Reality (AR)/Virtual Reality (VR) data, etc.). Due to recent advancements in communications technologies, conventional teleconferencing techniques provide the capability for a "presenting" participant to present content to other participants in the teleconference. For example, a presenting participant may be viewing a slide deck via a display device. Using conventional teleconferencing techniques, the presenting participant can present the slide deck to other participants of the teleconference by streaming video data that captures what is displayed at the display device (i.e., by "sharing their screen").

SUMMARY

Aspects and advantages of embodiments of the present disclosure will be set forth in part in the following description, or can be learned from the description, or can be learned through practice of the embodiments One example implementation of the present disclosure is directed to a computer-implemented method for increasing teleconferencing bandwidth efficiency via presentation of remotely accessible content. The method can include receiving, by a computing system comprising one or more computing devices, a request to present content to a teleconference from a presenting participant device of the teleconference. The method can include generating, by the computing system, a unit of software instructions that is configured to cause a participant device to access the content from an originating location that differs from the presenting participant device and display the content within a shared content interface of the teleconference. The shared content interface is configured to display a view of the content that is consistent between each participant device of the teleconference. The method can include providing, by the computing system, the unit of software instructions to one or more non-presenting participant devices of the teleconference.

Another implementation of the present disclosure is directed to a participant computing device. The participant computing device includes one or more processors. The participant computing device includes one or more non-transitory computer-readable media that store instructions that, when executed by the one or more processors, cause the participant computing device to perform operations. The operations include receiving an input from a participant associated with the participant computing device that selects content for presentation to a teleconference. The content is accessible from an originating location that differs from the participant computing device. The teleconference comprises one or more additional participant devices. The operations include generating a request to present the content within the teleconference, wherein the request to present the content within the teleconference is descriptive of the content and the originating location. The operations include providing the request to present the content within the teleconference to one or more computing devices. The operations include displaying the content within a shared content interface of the teleconference, wherein the shared content interface is configured to display a view of the content that is consistent between the participant computing device and the one or more additional participant devices.

Another example aspect of the present disclosure is directed to one or more non-transitory computer-readable media that store instructions that, when executed by one or more processors of a computing system, cause the computing system to perform operations. The operations include receiving a request to present content to a teleconference from a presenting participant device of the teleconference, wherein access to the content is restricted to participant devices with content access credentials. The operations include determining that the content is presentable based on at least one criterion. The operations include generating a unit of software instructions that is configured to cause a participant device to access the content from an originating location that differs from the presenting participant device and display the content within a shared content interface of the teleconference. The shared content interface is configured to display a view of the content that is consistent between each participant device of the teleconference. The operations include providing, to each of one or more non-presenting participant devices of the teleconference, data that comprises interaction information, the unit of software instructions, and the content access credentials for the content, wherein the interaction information is descriptive of a participant input to the shared content interface received at the presenting participant device.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 1A depicts an overview data flow diagram for presentation of remotely accessible content to a teleconference according to some implementations of the present disclosure.

Figure 1B:
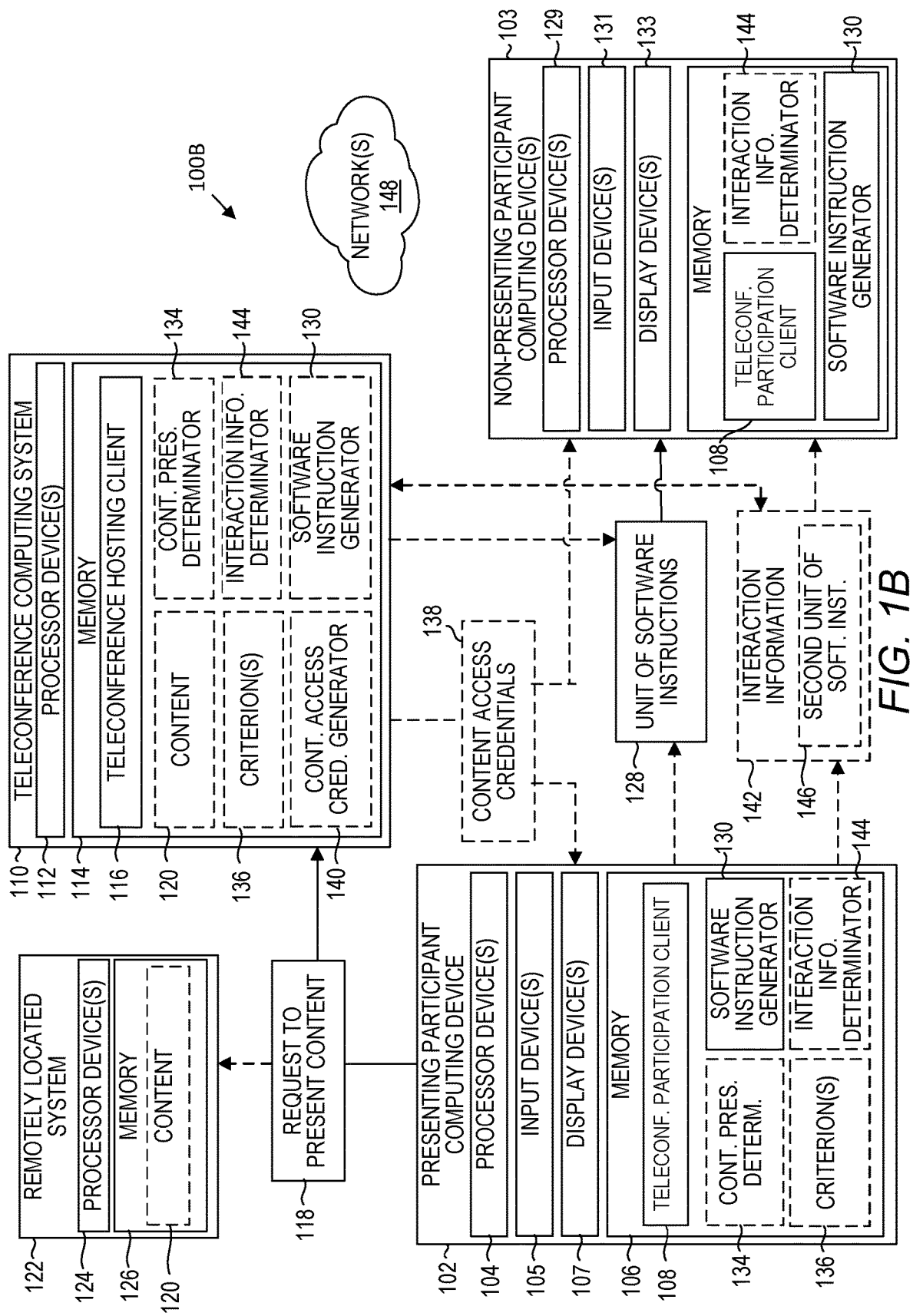
FIG. 1B depicts a detailed data flow diagram for presentation of the content to the teleconference according to some implementations of the present disclosure.

Reference numerals that are repeated across plural figures are intended to identify the same features in various implementations.

DETAILED DESCRIPTION

Aspects of the present disclosure are directed to the presentation of content from a remote originating location within a shared content interface of a teleconference. Generally, conventional teleconference services allow participants to share content via streaming of video data (e.g., video data depicting a view of what is displayed on a presenting participant's display device, etc.). However, the process of streaming video data (e.g., encoding, broadcasting, decoding, etc.) is very computationally expensive, and therefore requires access to substantial compute resources (e.g., bandwidth, memory, compute cycles, etc.). If any participants in a teleconference cannot meet these requirements, they will be unable to receive the shared content, and therefore will be unable to participate.

Accordingly, rather than sharing content via streaming of video data, aspects of the present disclosure propose sharing of remotely originating content directly within a shared content interface. For example, a computing system (e.g., a server computing system hosting a teleconference, etc.) can receive a request from a presenting participant device to present content to the teleconference (e.g., a webpage, an application, a document, etc.). The content can originate from a location that is different than that of the presenting participant device. For example, the content can be a webpage hosted on a remote server. For another example, the content can be a web application hosted by the computing system.

In response, the computing system can generate a unit of software instructions (e.g., code, Application Programming Interface (API) instructions, etc.). The unit of software instructions can be configured to cause a participant computing device (e.g., a smartphone, a laptop, etc.) to access the content from the originating location that differs from the presenting participant device. For example, the content can be a web-based slide deck hosted at the originating location (e.g., servers associated with a slide deck service provider, etc.). The unit of software instructions can indicate a web page on which the slide deck is hosted (e.g., via a Uniform Resource Locator (URL), etc.), and can cause other participant devices to access the web page.

The unit of software instructions can also be configured to cause the participant device to display the content within a shared content interface of the teleconference (e.g., an interface that displays shared content and allows participant(s) to interact with the content). The shared content interface can display any video data associated with participants while also displaying content presented to the teleconference. For example, the unit of software instructions can instruct a participant device to navigate to a web page using a browser application included within the shared content interface. The shared content interface can be configured to display a view of the content that is consistent between each participant device of the teleconference (i.e., a "shared" view of the content). For example, the content can be a web page, and each participant device can have an input device that controls a cursor (e.g., a mouse, a touchscreen, etc.). The shared content interface can depict the cursors of each participant device as they are moved by participants within the shared content interface. If a cursor is moved within the shared content interface at one participant device, the same cursor movement can be depicted within the shared content interface at a different participant device.

Once the computing system has generated the unit of software instructions, the computing system can provide the unit of software instructions to non-presenting participant device(s) of the teleconference. The non-presenting participant device(s) can access the content upon receipt of the unit of software instructions. In such fashion, the computing system can facilitate access to remotely originating content for each participant of a teleconference.

Implementations of the present disclosure provide a number of technical effects and benefits. As one example technical effect and benefit, conventional teleconferencing techniques generally require that content be presented to a teleconference via a video stream. However, the process of capturing, encoding, uploading, and broadcasting a video stream demands a substantial quantity of computing resources (e.g., power, compute cycles, bandwidth, network resources, memory, storage, etc.), and generally provides a view of the content that is substantially reduced (e.g., due to lossy compression, loss via data transmission, bandwidth constraints, etc.). Accordingly, rather than providing a video stream to present content, implementations of the present disclosure facilitate access of remotely originating content by participants of a teleconference within a shared content interface. Specifically, by providing direct access to content, rather than a lossy video representation of the content, implementations of the present disclosure can provide increased presentation quality while substantially reducing the quantity of computing resources utilized.

With reference now to the Figures, example implementations of the present disclosure will be discussed in further detail.

FIG. 1A depicts an overview data flow diagram 100A for presentation of remotely accessible content to a teleconference according to some implementations of the present disclosure. Specifically, the overview data flow diagram 100 can include a presenting participant computing device 102. The presenting participant computing device 102 can include processor device(s) 104 (Application-specific Integrated Circuits (ASICs), a processor core, a microprocessor, Field-Programmable Gate Array (FPGA), a controller, a microcontroller, etc.). Additionally, the presenting participant computing device 102 can include memory 106 (e.g., Random Access Memory (RAM), Read-only Memory (ROM), Electrically Erasable Programmable ROM (EEPROM), EPROM, Solid State Drives (SSDs), flash memory devices, magnetic disks, etc.).

The memory 106 can include instructions that, when executed, can cause the processor device(s) 104 to perform operations associated with execution of various application(s). Specifically, the memory 106 can include a teleconference participation client 108. The teleconference participation client 108 can be a client configured to join and leave teleconferencing sessions and to facilitate participation within a teleconference. For example, the teleconference participation client 108, when executed by any participant computing device (e.g., presenting participant computing device 102, non-presenting participant computing device(s) 103, etc.), can include, or otherwise display, a shared content interface that facilitates participation in a teleconferencing session. For example, video streams corresponding to participants of the teleconference can be included in one portion of the shared content interface. Presented content can be included in another portion of the shared content interface. Control elements for the teleconference can be included in yet another portion of the shared content interface (e.g., an input control element such as a "mute button", a settings interface element, a connect/disconnect interface element, etc.).

The shared content interface can be generated by the presenting participant computing device 102 using a shared content interface generator 109 of the teleconference participation client 108. In particular, the shared content interface can be any sort of interface that facilitates teleconferencing and/or the sharing of shared content. As an example, the shared content interface can be a two-dimensional interface configured to display video streams from multiple participants while also displaying shared content (e.g., a large window that displays the shared content and multiple smaller windows to display the multiple video streams). As another example, the shared content interface may be a three-dimensional AR/VR space in which shared content is displayed as an object within the three-dimensional space, while multiple participants may control multiple three-dimensional avatars within the three-dimensional space that view the three-dimensional space from a first-person perspective. As yet another example, the shared content interface may be an interface configured to cause playback of audio streams from multiple participants while also causing playback of shared audio content (e.g., causing playback of audio streams from multiple participants in a teleconferencing book club while also causing playback of an audio book, etc.).

It should be noted that, in some implementations, the shared content interface can be a collaborative interface. For example, the shared content interface can facilitate collaboration by multiple participants by allowing both presenting participants and non-presenting participants to interact with the shared content. These interactions can be propagated between local instances of the shared content interface displayed at each corresponding participant computing device such that the view of the shared content interface is consistent among all participants.

For example, one participant computing device (e.g., presenting participant computing device 102) can receive an input that modifies the shared content in the shared content interface (e.g., a mouse click input that selects a navigation element on a web page). This input can be provided to another participant computing device (e.g., non-presenting participant computing device(s) 103) so that the shared content at the other participant computing device receives the same input (e.g., the mouse click input), and is therefore modified in the same manner (e.g., also navigates to the next page indicated by the navigation element). In such fashion, the shared content interface can, in some implementations, provide a shared view of the interface to facilitate collaboration between participants.

However, it should be noted that collaboration is not required by all participants who are provided content within a shared content interface. For example, the non-presenting participant computing device 103 can be a smartphone device. The content shared within the shared content interface can be content that can only be interacted with using a mouse input device. As such, the participant computing devices that can receive inputs from a mouse input device (e.g., a laptop participant computing device, etc.) can generate a shared content interface that is configured to receive participant inputs, while participant computing devices that cannot receive inputs from a mouse input device (e.g., a smart watch participant computing device, etc.) can generate a shared content interface that is only configured to reflect participant inputs from other participants.

Additionally, it should be noted that the shared content interface can be any sort of interface sufficient to display shared content. For example, the shared content interface can be a two-dimensional interface that displays shared content in a two-dimensional window. For another example, the shared content interface can be a three-dimensional interface (e.g., provided via an Augmented Reality (AR)/Virtual Reality (VR) device) that is sufficient to depict three-dimensional shared content to a user. As such, it should be broadly understood that the shared content interface can be any type or manner of interface.

The data flow diagram 100 can also include a teleconference computing system 110. The teleconference computing system 110. The teleconference computing system 110 can be a computing system configured to host teleconferencing sessions to facilitate teleconferencing between participant devices (e.g., presenting participant computing device 102, non-presenting participant computing device(s) 103, etc.). For example, the teleconference computing system 110 can be a server computing system that is part of a cloud computing network (e.g., a distributed network of computing devices/systems that collectively host services, etc.). For another example, the teleconference computing system 110 can be a virtualized computing system configured to host teleconferencing sessions (e.g., via teleconference hosting client 116, etc.).

In some implementations, the shared content interface generator 109 can generate the shared content interface responsive to a request to share content. For example, the teleconference participation client 108 may generate a teleconferencing interface that displays video streams for multiple participants alongside control elements to modify participant settings for the teleconference. The teleconference participation client 108 may identify a request to share content. In response, the teleconference participation client 108 may generate the shared content interface and transition to the shared content interface from the currently displayed interface.

The teleconference computing system 110 can include processor device(s) 112 and memory 114 as described with regards to processor device(s) 104 and memory 106. The memory 114 can include a teleconference hosting client 116. The teleconference hosting client 116 can host teleconferencing sessions for participant computing devices (e.g., devices 102, 103, etc.). For example, the teleconference hosting client 116 can be, or otherwise include, unit(s) of software instructions (e.g., programming instructions, machine code, compiled code, interpreted code, etc.) that, when executed, can receive communication data (e.g., video data, audio data, AR/VR data, multimedia data, etc.) from one participant computing device and broadcast the communication data to any other participant computing devices that are participating in the teleconferencing session hosted by the teleconference computing system 110.

The teleconference computing system 110 can receive a request 118 to present content 120 that is transmitted from the presenting participant computing device 102. The request to present content can be a request that indicates a specific piece of content to be presented to the teleconference. Specifically, content 120 indicated by the request 118 to present content 120 can be presented within the shared content interface of the teleconference participation client 108 (e.g., using the shared content interface generator 109). The content 120 can be accessed from an originating location that differs from the presenting participant device 102 (e.g., a computing system other than the presenting participant device 102, etc.).

In some implementations, the teleconference computing system 110 can include the content 120 indicated by the request 118 to present content 120. In other words, the teleconference computing system 110 can be, or can otherwise include, the originating location for the content 120. For example, the request 118 to present content 120 can indicate content 120 that is, or otherwise includes, a slide deck created and hosted on a web page using a slide deck service. The web page (e.g., the content 120) can be hosted by the teleconference computing system 110. For another example, the request 118 to present content 120 can indicate content 120 that is, or otherwise includes, an application executed by the teleconference computing system 110.

Alternatively, in some implementations, the teleconference computing system 110, the presenting participant computing device 102, and/or the non-presenting participant computing device 103 can access the content 120 from a remotely located system 122 (e.g., the originating location of the content, etc.). The remotely located system 122 can include processor device(s) 124 and memory 126 as discussed with regards to processor device(s) 104 and memory 106. The memory 126 of the remotely located system 122 can, in some implementations, include the content 120. The remotely located system 122 can be, or otherwise include, one or more computing devices within a cloud computing network (e.g., a cloud network that also includes the teleconference computing system 110, a cloud network different than one that includes the teleconference computing system 110, etc.). For example, the content 120 can be a remotely hosted web page. The remotely located system can be computing device(s) within the same cloud computing network as the teleconference computing system 110 that hosts the web page. For another example, the remotely located system can be a computing system (e.g., a server computing system, etc.) unaffiliated with the teleconference computing system 110 that provides access to the content 120 (e.g., provides the content 120 for download, etc.).

The presenting participant computing device 102 can transmit a request to present content 120 to the teleconference computing system 110. In response, the teleconference computing system 110 can generate a unit of software instructions 128. For example, the teleconference computing system 110 can utilize a software instruction generator 130 to generate the unit of software instructions 128. The unit of software instructions 128 can be, or otherwise include, software instruction(s) that are configured to cause a participant computing device to access the content 120 from an originating location that differs from the presenting participant computing device 102 (e.g., the teleconference computing system 110, the remotely located system 122, etc.).

The unit of software instructions 128 can also cause a participant device to display the content 120 within the shared content interface of the teleconference. As described previously, the shared content interface can be configured to display a view of the content 120 that is consistent between each participant device of the teleconference. For example, the teleconference computing system 110 can include the content 120, or can retrieve the content 120 from the remotely located system 122. The content 120 can be a native application, and instances of the application can be executed at the teleconference computing system 110, the presenting participant computing device 102, and the non-presenting participant computing device(s) 103. The instances of the application can be displayed within the shared content interface at the presenting participant computing device 102, and the non-presenting participant computing device(s) 103.

The teleconference computing system can provide the unit of software instructions 128 to the non-presenting participant computing device(s) 103. The non-presenting participant computing device(s) 103 can include processor device(s) 129 and memory 132 as described with regards to presenting participant computing device 102. The memory of the non-presenting teleconference computing device 103 can include the teleconference participation client 108 (e.g., the same, or a substantially similar teleconference participation client as that of the presenting participant computing device 102, etc.). Upon receipt of the unit of software instructions 128, the non-presenting participant computing device(s) 103 can access the content 120. For example, the non-presenting participant computing device(s) 103 can access the content 120 from the teleconference computing system 110, or the remotely located system 122 (e.g., via network infrastructure (e.g., a Publicly Switch Telephone Network (PSTN), a wireless network, a Local Access Network (LAN), etc.).

To follow the previous example, unit of software instructions 128 can be configured to cause a participant device to execute an instance of the application (e.g., the content 120). In response to receiving the unit of software instructions 128, the non-presenting participant computing device(s) 103 can execute (e.g., instantiate, etc.) the instance of the application (e.g., the content 120). Specifically, the non-presenting participant computing device(s) 103 can render the content 120 within the shared content interface of the teleconference (e.g., for a display device associated with non-presenting participant computing device(s) 103).

As another example, the content 120 can be a web page hosted at the remotely located system 122. The unit of software instructions 128 can include a URL that links to the content 120. Upon receipt of the unit of software instructions 128, the non-presenting computing device 103 can access the content 120 at the remotely located system 122. The non-presenting computing device 103 can display the accessed content 120 within the shared content interface of the teleconference. For example, the unit of software instructions 128 can be configured to cause the non-presenting computing device 103 to execute a web browser application and embed the web browser application within the shared content interface (e.g., in a similar manner to which a video stream of a content item can be embedded). The unit of software instructions 128 can be then configured to cause the non-presenting computing device 103 to access the content 120 (e.g., the web page) with the web browser to display (e.g., render) the content 120 in the shared content interface.

It should be noted that, as used herein, various terms, such as broadcast, participant teleconference, etc. can be broadly defined. More particularly, the following definitions provide an overview of these terms as described herein.

Broadcast: As used herein, broadcast or broadcasting refers to any real-time transmission of data (e.g., audio data, video data, AR/VR data, etc.) from a user device and/or from a centralized device that facilitates a teleconference (e.g., a centralized server device, etc.). For example, a broadcast can refer to the direct or indirect transmission of data from a user device to a number of other user devices. It should be noted that, in some implementations, broadcast or broadcasting can include the encoding and/or decoding of transmitted and/or received data. For example, a user device broadcasting video data can encode the video data using a codec. User devices receiving the broadcast can decode the video using the codec.

Participant: As used herein, a participant can refer to any user, group of users, device, and/or group of devices that participate in a live exchange of data (e.g., a teleconference, videoconference, etc.). More specifically, participant can be used throughout the subject specification to refer to either user(s) or user device(s) utilized by the user(s) within the context of a teleconference. For example, a group of participants can refer to a group of users that participate remotely in a videoconference with their own user devices (e.g., smartphones, laptops, wearable devices, teleconferencing devices, broadcasting devices, etc.). For another example, a participant can refer to a group of users utilizing a single computing device for participation in a videoconference (e.g., a videoconferencing device within a meeting room, etc.). For another example, participant can refer to a broadcasting device (e.g., webcam, microphone, etc.) unassociated with a particular user that broadcasts data to participants of a teleconference. For yet another example, participant can refer to a bot or an automated user that participates in a teleconference to provide various services or features for other participants in the teleconference (e.g., recording data from the teleconference, providing virtual assistant services, providing testing services, etc.).

Teleconference: As used herein, a teleconference (e.g., videoconference, audioconference, media conference, Augmented Reality (AR)/Virtual Reality (VR) conference, etc.) is any communication or live exchange of data (e.g., audio data, video data, AR/VR data, etc.) between a number of participants. For example, a teleconference can refer to a videoconference in which multiple participants utilize computing devices to transmit video data and/or audio data to each other in real-time. For another example, a teleconference can refer to an AR/VR conferencing service in which AR/VR data (e.g., pose data, image data, etc.) sufficient to generate a three-dimensional representation of a participant is exchanged amongst participants in real-time. For another example, a teleconference can refer to a conference in which audio signals are exchanged amongst participants over a mobile network. For yet another example, a teleconference can refer to a media conference in which different types or combinations of data are exchanged amongst participants (e.g., audio data, video data, AR/VR data, a combination of audio and video data, etc.).

FIG. 1B depicts a detailed data flow diagram 100B for presentation of the content 120 to the teleconference according to some implementations of the present disclosure. It should be noted that FIG. 1B includes the same devices and systems as those of FIG. 1A, and merely illustrates those devices and systems in a more detailed view. For example, as depicted, the presenting participant computing device 102 can include input device(s) 105 and display device(s) 107. Similarly, the non-presenting participant computing device can include input device(s) 131 and 133. Input device(s) 105 and 131 can be any device(s) that allow a participant to provide an input to a participant computing device (e.g., a touchscreen, a mouse, an audio capture device, a video capture device configured for gesture recognition, an AR/VR device (e.g., a motion tracker, a gaze detector, etc.), a keyboard, etc.). The display device(s) 107 and 133 can be any device(s) sufficient to display the shared content interface of the teleconference (e.g., a television, computer monitor, AR/VR headset, a wearable computing device display, a smartphone display, a projector, etc.).

As described with regards to FIG. 1A, presenting participant computing device 102 can provide the request 118 to present content 120 to the teleconference computing system 110. In some implementations, the teleconference computing system 110 can determine whether the content 120 is presentable. For example, the teleconference computing system 110 can utilize a content presentability determinator 134 included in the memory 114 of the teleconference computing system 110 to evaluate criterion(s) 136 to determine whether the content 120 is presentable (e.g., a type of content of the content 120, an originating location of the content (e.g., whether it is local to the teleconference computing system 110, etc.), a size of the content 120, a bandwidth available to participant computing devices 102/103, etc.). Based on the determination, the unit of software instructions 128 can be generated.

Alternatively, in some implementations, the presenting participant computing device 102 can determine whether the content 120 is presentable. Specifically, the memory 106 of the presenting participant computing device 102 can include the content presentability determinator 134. The presenting participant computing device 102 can leverage the content presentability determinator 134 to determine whether the content 120 is presentable based on the criterion(s) 136. For example, the content 120 can be a web page of a small size (e.g., a web-based text editor, etc.). The presenting participant computing device 102 can receive an input from a participant via the input device(s) 105 that selects the content 120 for presentation. The criterion(s) 136 can include a bandwidth criterion that specifies a maximum size of content 120 that can be presented. The presenting participant computing device 102 can leverage the content presentability determinator to determine that the content 120 is presentable by evaluating the criterion(s) 136. The presenting participant computing device 102 can then send the request 118 to present content 120 to the teleconference computing system, and the request 118 to present content 120 can indicate to the teleconference computing system that the content 120 is presentable.

Additionally, or alternatively, in some implementations, the presenting participant computing device 102 can provide the request to present content to the remotely located system 122. For example, the content 120 can be located on the remotely located system 122. The presenting participant computing device 102 can provide the request 118 to present content 120 to the teleconference computing system 110, and the teleconference computing system 110 can determine that the content is presentable. The presenting participant computing device 102 can provide the request 118 to present content 120 to the remotely located system to retrieve, or otherwise access, the content 120.

In some implementations, the teleconference computing system 110 can generate the unit of software instructions 128 (e.g., using the software instruction generator 130). Alternatively, in some implementations, the presenting participant computing device 102 can generate the unit of software instructions 128 using a software instruction generator 130 included in the memory 114 of the teleconference computing system 110. For example, teleconference computing system 110 can determine that the content 120 is presentable. The teleconference computing system 110 can provide instructions to the presenting participant computing device 102 to generate the unit of software instructions 128 and provide the unit of software instructions 128 to the non-presenting participant device(s) 103.

For a more specific example, the teleconference computing system 110 can utilize the teleconference hosting client 116 to facilitate a Peer-to-Peer (P2P) teleconferencing session. In a P2P teleconferencing session, participant computing devices (e.g., 102 and 103) can send communication data (audio data, video data, etc.) to each other directly, rather than providing the communication data to the teleconference computing system 110. As such, the teleconference computing system 110 can facilitate the P2P teleconference session by instructing the presenting participant device 102 to generate the unit of software instructions 128 and provide the unit of software instructions 128 to the non-presenting participant computing device(s) 103.

In some implementations, the content can be content that is restricted to participant devices with content access credentials. For example, the content 120 can be a confidential document being drafted using a web-based text editing application (e.g., accessed via a web browser and a corresponding URL, etc.). The text editing application can specify that only authorized accounts can access the content 120. In addition to providing the unit of software instructions 128, the teleconference computing system 110 can also generate content access credentials 138 using a content access credentials generator 140 included in the memory 114 of the teleconference computing system 110. The content access credentials generator 140 can be, include, or otherwise implement a module configured to provide cryptographic operations. For example, the content access credentials generator 140 can be configured to generate key pairs. One of the key pairs can be stored in the memory 114 of the teleconference computing system 110, and another key can be included in the content access credentials 138.

Alternatively, to follow the previous example, the teleconference computing system 110 can identify an account for the text editing application that is associated with a participant of the non-presenting participant computing device 103. The teleconference computing system 110 can instruct the text editing application to authorize the account of the participant such that the participant can access the content 120. The teleconference computing system can provide the content access credentials 138 to the presenting participant computing device 102 and the non-presenting participant computing device(s) 103.

In some implementations, in addition to the unit of software instructions 128, the teleconference computing system 110 can also provide interaction information 142 to the non-presenting participant computing device 103 (e.g., by leveraging an interaction information determinator 144 included in the memory 114 of the teleconference computing system). Interaction information 142 can describe an input from a participant to the presenting participant computing device 102 using the input device(s) 105. Specifically, the interaction information 142 can describe a participant input to the shared content interface received at the presenting participant computing device 102.

For example, the presenting participant computing device 102 can display the shared content interface using the display device(s) 107. A participant associated with the presenting participant computing device 102 can provide an input that moves a cursor associated with a mouse input device (e.g., of the input device(s) 105) from one location within the shared content interface to a different location in the shared content interface. The interaction information 142 can describe the movement of the cursor from location to location.

In some implementations, the presenting participant computing device 102 can provide the interaction information 142 to the teleconference computing system. The teleconference computing system 110 can then provide the interaction information to the non-presenting participant computing device(s) 103. Alternatively, in some implementations, the presenting participant computing device 102 can provide the interaction information 142 directly to the non-presenting participant computing device(s) 103.

In some implementations, the interaction information 142 can include a second unit of software instructions 146. The second unit of software instructions 146 can be configured to cause a participant device to depict the participant input described by the interaction information 142 within the shared content interface displayed at the participant device.

To follow the previous example, the interaction information 142 describing the cursor movement can include the second unit of software instructions 146. The interaction information 142 can be provided to the non-presenting participant computing device(s) 103. A non-presenting participant computing device 103 can be displaying the shared content interface, and a cursor of a mouse input device of the input device(s) 131 can be displayed within the shared content interface (i.e., the "non-presenting participant's cursor"). Upon receipt, the second unit of software instructions 146 can cause the non-presenting participant computing device 103 to depict the cursor of the presenting participant computing device 102 (i.e., the "presenting participant's cursor") perform the cursor movement described by the interaction information 142. For example, the cursor movement can be a movement that moves the presenting participant's cursor from a left side of the shared content interface to a right side of the shared content interface. The non-presenting participant's cursor can be depicted unmoving in the center of the shared content interface. While the non-presenting participant's cursor is depicted within the shared content interface, the second unit of software instructions 146 can cause the presenting participant's cursor to be depicted performing the movement (e.g., leading to two cursors being depicted simultaneously).

In some implementations, the presenting participant computing device 102 can generate the interaction information 142 and the second unit of software instructions 146. For example, the presenting participant computing device 102 can leverage the software instruction generator 130 and the interaction information determinator 144. Alternatively, in some implementations, the presenting participant computing device 102 can provide the interaction information to the teleconference computing system 110. The teleconference computing system 110 can generate the second unit of software instructions 146 using the software instruction generator 130 and include the second unit of software instructions 146 within the interaction information 142.

It should be noted that network(s) 148 can be utilized to facilitate communication between the presenting participant computing device 102, the non-presenting participant computing device 103, the teleconference computing system 110, the remotely located system 122, etc. The network(s) 148 can be, or otherwise include, any networks or network infrastructure sufficient to facilitate the flow of data between the depicted devices and systems. Network communications, and technical operations of various systems and devices of the present disclosure, will be discussed in greater detail with regards to FIG. 4.

Figure 2:
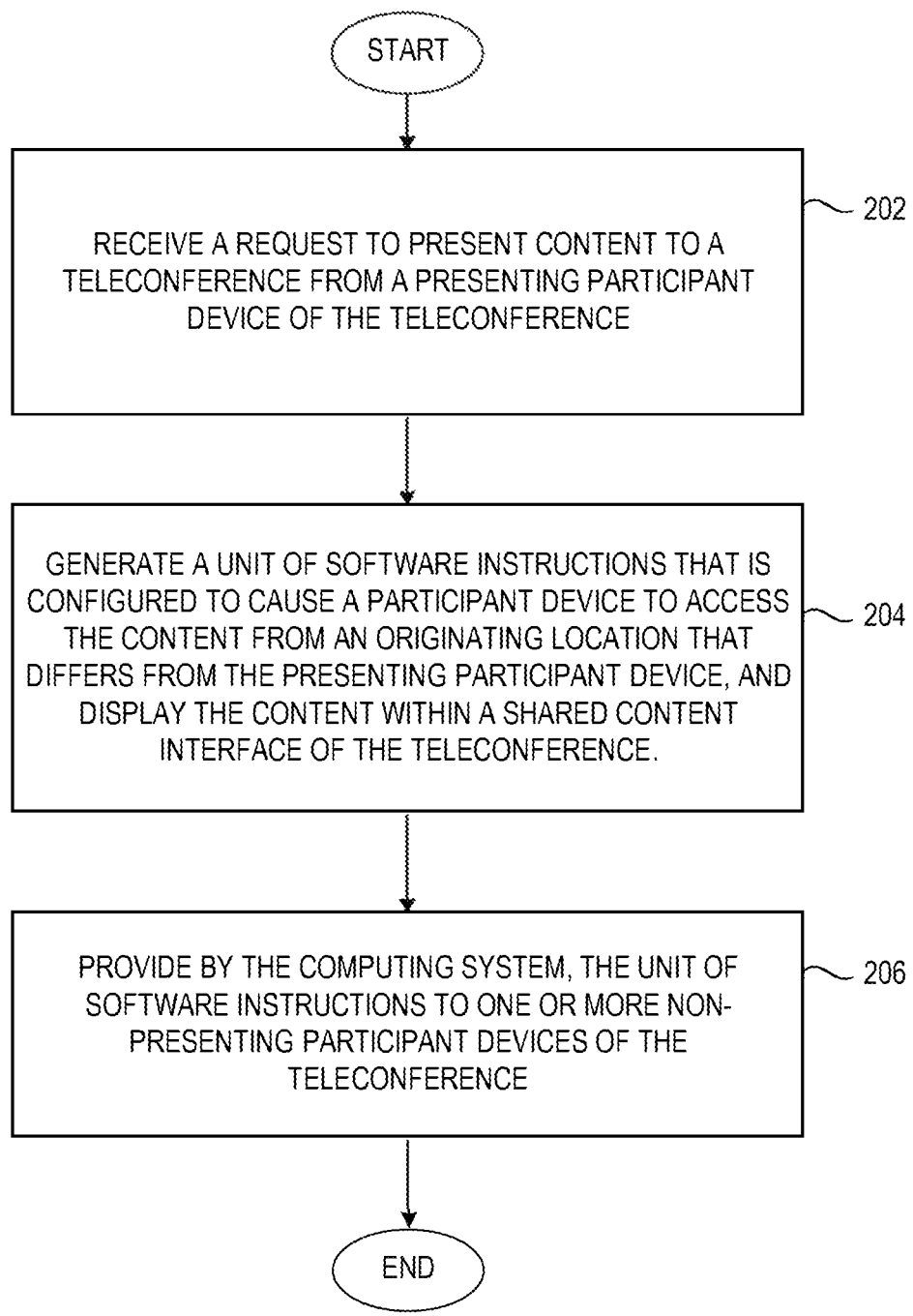
FIG. 2 depicts a flow chart diagram of an example method for increasing teleconference bandwidth efficiency according to some implementations of the present disclosure.

FIG. 2 depicts a flow chart diagram of an example method 200 for increasing teleconference bandwidth efficiency according to some implementations of the present disclosure. FIG. 2 is discussed with regards to FIGS. 1A and 1B. Although FIG. 2 depicts operations performed in a particular order for purposes of illustration and discussion, the methods of the present disclosure are not limited to the particularly illustrated order or arrangement. The various operations of the method 200 can be omitted, rearranged, combined, and/or adapted in various ways without deviating from the scope of the present disclosure.

At operation 202, a computing system (e.g., teleconference computing system 110 of FIGS. 1A/1B, etc.) can receive a request 118 to present content 120 to a teleconference from a presenting participant computing device 102 of the teleconference. As described previously, the request can be any form or manner of data sufficient to indicate a specific piece of content 120 and a request to present the content 120. For example, the teleconference computing system 110 can include one or more application programming interfaces (e.g., implemented via the teleconference hosting client 116). The teleconference computing system 110 can receive the request 118 in the form of Javascript Object Notation (JSON) data that indicates the content 120.

Additionally, in some implementations, the request 118 to present content 120 can indicate other aspects of the content 120. For example, the request 118 can indicate a size of the content 120, a file type of the content 120, a location of the content 120, etc. Additionally, in some implementations, the request 118 can describe various aspects of the presenting participant computing device 102 (e.g., processing capabilities, display capabilities, bandwidth capabilities, storage capabilities, battery life, etc.).

At operation 204, the computing system (e.g., teleconference computing system 110 of FIGS. 1A/1B, etc.) can generate a unit of software instructions 128. The unit of software instructions 128 can be instructions of any form or manner sufficient to cause a participant device to perform operations. For example, the unit of software instructions 128 can be encrypted instructions that can be decrypted by the non-presenting participant computing device(s) 103. For another example, the unit of software instructions 128 can be plaintext data (e.g., JSON data, etc.) that indicates a location of the content 120. For another example, the unit of software instructions 128 can be signaling data transmitted over a wireless communications network (e.g., a 5G (Fifth Generation) New Radio (NR) network, a Long-Term Evolution (LTE) network, etc.).

The unit of software instructions 128 can be configured to cause a participant device to access the content 120 from an originating location that differs from the presenting participant computing device 102. For example, the originating location can be the computing system. For another example, the originating location can be a remotely located and accessible computing system (e.g., remotely located system 122, etc.), such as a computing system of a cloud hosting service. For another example, the originating location can be multiple originating locations that host data in a distributed fashion (e.g., a decentralized, P2P file sharing network, a distributed cloud computing system, etc.).

The unit of software instructions 128 can also be configured to cause the participant device to display the content 120 within the shared content interface of the teleconference. The shared content interface of the teleconference can be configured to display a view of the content that is consistent between each participant device of the teleconference. The consistent view of the shared content interface will be discussed in greater detail with regards to FIGS. 3A and 3B.

As an example, the content 120 can be an application hosted by the computing system. The unit of software instructions 128 can cause the participant device to retrieve data from the computing system to execute an instance of the application locally at the participant computing device. In some implementations, the application can be partially or fully executed at the computing system. For example, the computing system can execute the application and maintain a consistent application state. The participant devices of the teleconference can execute instances of the application. Changes to the application state, or instructions configured to effect the changes to the application state, can be communicated from the computing system to the participant devices. For example, the application can be a video game that is processed in a distributed fashion in which partial processing occurs at both the computing system and the participant devices.

As another example, the content 120 can be a web page hosted at the computing system. The unit of software instructions 128 can be configured to cause the participant devices to execute an instance of a web browser application and navigate to a URL associated with the web page using the web browser application. In some implementations, the web browser application can be included in the teleconference (e.g., the teleconference participation client 108, etc.). Alternatively, the web browser application can be a native application, and the unit of software instructions 128 can instruct the participant devices to execute an instance of the web browser application and embed the instance within a portion of the shared content interface configured for presentation of content.

In some implementations, prior to generating the unit of software instructions 128, the computing system can determine that the content is presentable based on criterion(s) 136. The criterion(s) 136 can include any criterion sufficient to determine whether content is presentable. For example, in some implementations, the criterion(s) 136 can include a location criterion that evaluates a location of the originating location that differs from the presenting participant device 102. For example, the content 120 can be region restricted such that some participant devices cannot access the content 120. Additionally, or alternatively, in some implementations, the criterion(s) 136 can include a content type criterion that evaluates a type of content of the content 120 (e.g., file type(s), etc.). For example, the content 120 can have a file type that cannot be executed by some of the non-presenting participant computing device(s) 103 (e.g., due to operating system incompatibility, etc.).

Additionally, or alternatively, in some implementations, the criterion(s) 136 can include a size criterion that evaluates a size of the content 120. For example, if the size of the content 120 is exceedingly large (e.g., 10 gigabytes, 50 gigabytes, etc.), it can be more efficient to stream a video capture of the content 120 rather than provide remote access to the content 120. Additionally, or alternatively, in some implementations, the criterion(s) 136 can include security characteristics of the content 120. For example, the computing system can determine that security vulnerabilities exist within the content 120, and that providing remote access to the content 120 would present unacceptable security risks.

Additionally, or alternatively, in some implementations, the criterion(s) 136 can include an available bandwidth criterion that evaluates an available bandwidth of the presenting participant device 102 and/or the non-presenting participant device(s) 103. For example, a non-presenting participant device 103 can be a smartphone with limited cellular coverage (e.g., bandwidth). For another example, a non-presenting participant device 103 can be a laptop served by an internet service provider that implements strict bandwidth caps, or that provides low bandwidth internet services. If access to the content 120 necessitates constant streaming of data, the computing system can determine that the content 120 is not presentable. Additionally, or alternatively, in some implementations, the criterion(s) 136 can include a content access capability criterion. For example, the content 120 can be age-restricted content, and a non-presenting participant device 103 can have parental control parameters activated. For another example, the content 120 can be paid content that requires a purchase or subscription, and a non-presenting participant device 103 can currently lack access capabilities for the paid content.

At operation 206, the computing system (e.g., teleconference computing system 110 of FIGS. 1A/1B, etc.) can provide the unit of software instructions 128 to the non-presenting participant device(s) 103. For example, the computing system can communicate the unit of software instructions 128 via wired or wireless network(s).

In some implementations, providing the unit of software instructions to the non-presenting participant device(s) 103 further includes providing interaction information 142 for the presenting participant device 102 to the one or more non-presenting participant devices 103. The interaction information 142 can be descriptive of a participant input to the shared content interface received at the presenting participant device 102. In some implementations, the participant input to the shared content interface includes an input from an input device 105 of the presenting participant device 102 that moves a cursor located within the shared content interface displayed by the presenting participant device 102 (e.g., at the display device(s) 107, etc.).

In some implementations, the interaction information 142 for the presenting participant device 102 includes a second unit of software instructions 146 that is configured to cause a participant device to depict the participant input within the shared content interface. For example, the input can be a right-click input that opens up a contextual menu. The second unit of software instructions 146 can be configured to depict the participant input opening the context menu at the location of the participants cursor.

In some implementations, the content 120 can be, or otherwise include, a web page that includes a navigational element configured to navigate to a second web page. The computing system can receive interaction information (e.g., additional interaction information) for a non-presenting participant device 103. The interaction information can be descriptive of a participant input within the shared content interface received at the non-presenting participant device 103 that selects the navigational element of the webpage (e.g., a touch input, a mouse click input, etc.). The computing system can provide the interaction information for the non-presenting participant device to the presenting participant device. In some implementations, the interaction information for the non-presenting participant device can include a unit of software instructions that is configured to cause a participant device to navigate from the web page to the second web page within a web browser of the shared content interface at the participant device.

In some implementations, the non-presenting participant device(s) 103 can include multiple non-presenting participant devices 103. When providing the interaction information for the non-presenting participant device 103 to the presenting participant device, the computing system can also provide the interaction information for the non-presenting participant device 103 to the other non-presenting participant device(s) 103.

In some implementations, the computing system can be, or otherwise include, the presenting participant device 102. To provide the interaction information 142, the computing system can cause the participant computing device 102 to navigate from the web page to the second web page within the shared content interface of the teleconference.

In some implementations, the content 120 can be an application included in the computing system (e.g., memory 114 of the teleconference computing system 110, etc.). The computing system can receive interaction information 142 descriptive of a participant input to an instance of the application executed at the presenting participant device 102. The computing system can provide the interaction information 142 to the non-presenting participant device(s) 103. For example, the application can be a quiz video game in which answers to a question can be selected. The computing system can receive interaction information 142 descriptive of a participant input to an instance of the application that selects an answer to a presented question. Selection of an answer can cause the application to change to a different application state (e.g., a state in which a participant is informed whether the answer is correct, etc.). The computing system can provide the interaction information 142 to the non-presenting participant devices that indicates the change in application state. For example, the interaction information 142 can cause replication of the participant input at local instances of the application executed at the non-presenting participant device(s). For another example, the interaction information 142 can include instructions that indicate selection of the answer to the local instances of the application.

In some implementations, the content 120 can be is restricted to participant devices with content access credentials 138. When providing the unit of software instructions 128 to the non-presenting participant device(s) 103 of the teleconference, the computing system can provide the content access credentials 138 to each of the non-presenting participant device(s) 103 of the teleconference. For example, the content 120 can require an encrypted key to access. The computing system can generate a key pair for each of the non-presenting participant device(s) 103, and can store one key of each key pair in memory. The computing system can then transmit the other keys (e.g., the content access credentials 138) of each key pair to respective non-presenting participant device(s) 103.

In some implementations, the content access credentials 138 are configured to expire after a period of time. To follow the previous example, the computing system can, after a period of time, delete the stored keys of the key pairs from memory to remove the content access credentials 138 from the non-presenting participant device(s) 103.

Alternatively, in some implementations, the computing system can actively revoke the content access credentials 138 from the non-presenting participant device(s) 103. Specifically, the computing system can receive a request to stop presentation of content 120 from the presenting participant device 102. In response, the computing system can revoke the content access credentials from each of the non-presenting participant device(s) 103. For example, the content 120 can be an application or service that restricts access to authorized accounts. The computing system, upon receipt of the request to stop presentation, can instruct the application or service to de-authorize the accounts of participants associated with the non-presenting participant device(s) 103.

Figure 3A:
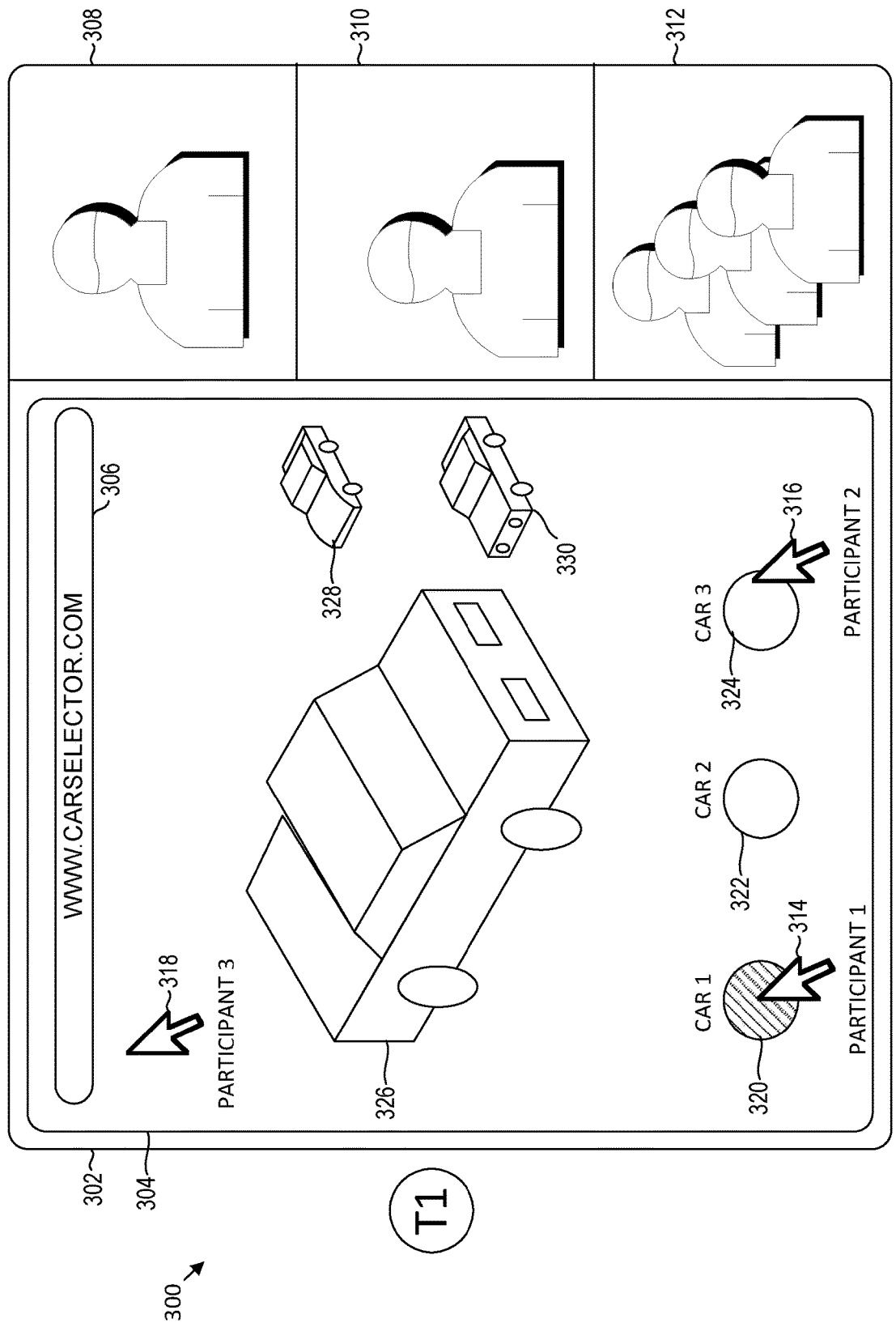
FIG. 3A illustrates an example shared content interface within a teleconference at a first time as displayed by a presenting participant device according to some implementations of the present disclosure.

FIG. 3A illustrates an example shared content interface 302 within a teleconference 300 at a first time T1 as displayed by a presenting participant device according to some implementations of the present disclosure. Specifically, the shared content interface 302 can be displayed by a presenting participant device once a presenting participant 308 provides an input that selects content 306 for presentation using a participant device. The participant device of presenting participant 308 can send a request to present the content 306 within the shared content interface 302 of the teleconference 300. As depicted, the shared content interface 302 depicts a presenting participant 308, a non-presenting participant 310, and non-presenting participants 312. It should be noted that the non-presenting participants 312 can collectively use a single non-presenting participant device (e.g., a participant device located within a meeting room, etc.). The shared content interface 302 includes content 306. Content 306 is a web page that allows participants to select different cars. The shared content interface 302 also includes a web browser 304 that is used to access the content 306.

As depicted, the shared content interface 302 provides a consistent view between each participant device of the teleconference 300. Specifically, at the current view at time T1, each participant can view each other participants' cursors. For example, prior to time T1 the presenting participant 308 can control cursor 314 to move the cursor 314 to the interface element 320. The interface element 320 can select vehicle 326. As the non-presenting participant moves cursor 314 within the shared content interface 302, participants 310 and 312 also view the cursor 314 moving. The presenting participant 308 can provide a selection input to the interface element 320 via the web browser 304. The content 306 can update due to the selection input and display the vehicle 326.

At time T1, the non-presenting participant 310 can move their cursor to the interface element 324. Interface element 324, when selected, can change the selected vehicle from vehicle 326 to vehicle 330. The non-presenting participant 310, at time T1, can provide a participant input that selects the interface element 324.

Figure 3B:
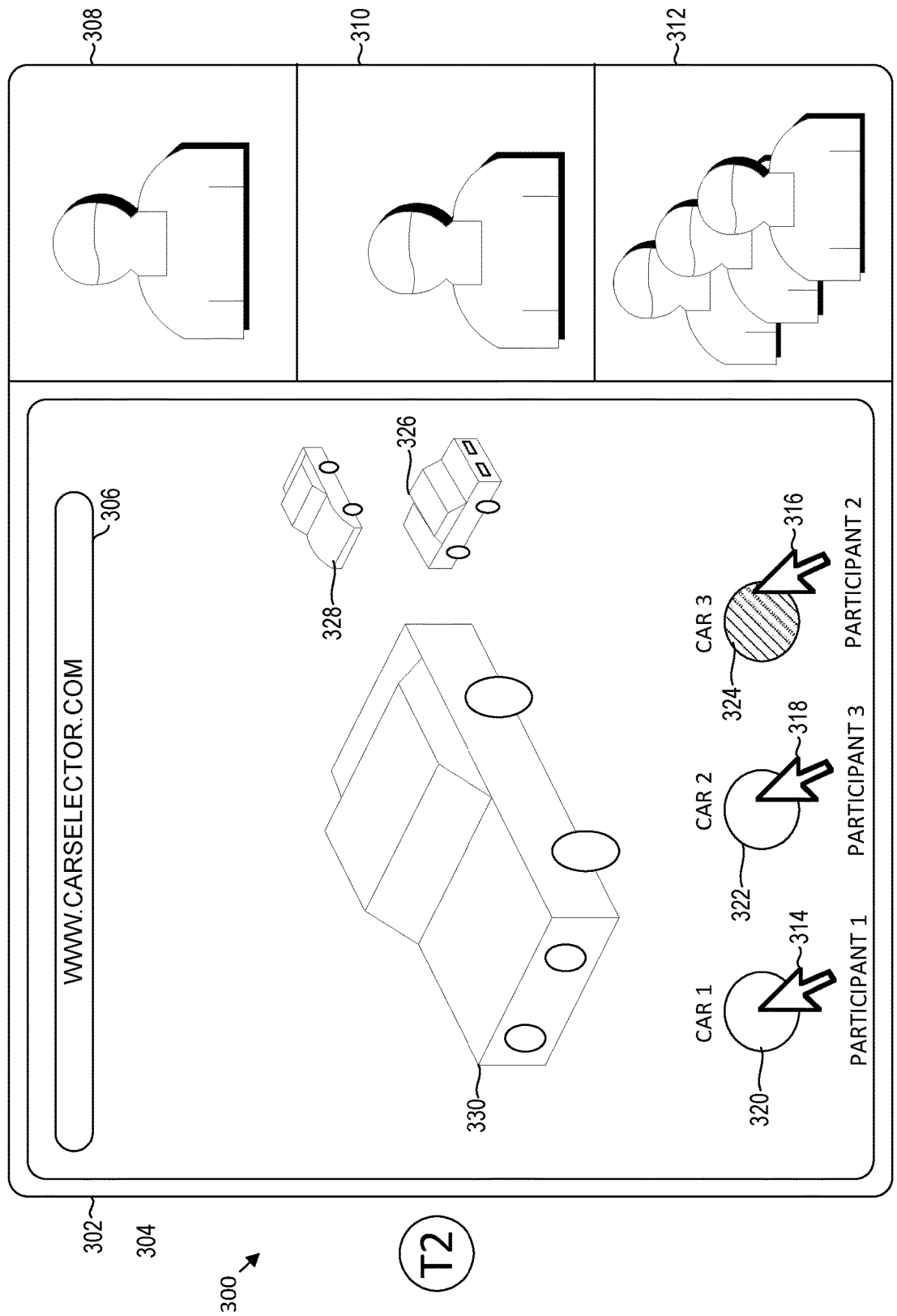
FIG. 3B illustrates the example shared content interface within the teleconference at a second time T2 as displayed by a non-presenting participant device corresponding to non-presenting participant according to some implementations of the present disclosure.

FIG. 3B illustrates the example shared content interface 302 within the teleconference 300 at a second time T2 as displayed by a non-presenting participant device corresponding to non-presenting participant 310 according to some implementations of the present disclosure. Specifically, it should be noted that although the shared content interface 302 is displayed at the participant device of the non-presenting participant 310, the view is consistent between the participant devices of the non-presenting participant 310 and the presenting participant 308.

At time T2, the content 306 is updated in response to the selection input from non-presenting participant 310. Specifically, the selected vehicle is changed from vehicle 326 to vehicle 330. Additionally, at time T2, the non-presenting participants 312 have provided an input that moves the cursor 318 to the interface element 322. The interface element 322, when selected, can change the selected vehicle to vehicle 328. If the non-presenting participants 312 provide a selection input that selects interface element 322 at time T2, at time T3 the selected vehicle can change from vehicle 330 to vehicle 328 from the view of the presenting participant 308, non-presenting participant 310, and non-presenting participants 312. In such fashion, implementations of the present disclosure provide a shared content interface 302 that is configured to display a view of the content 306 that is consistent between each participant device of the teleconference 300.

Figure 4:
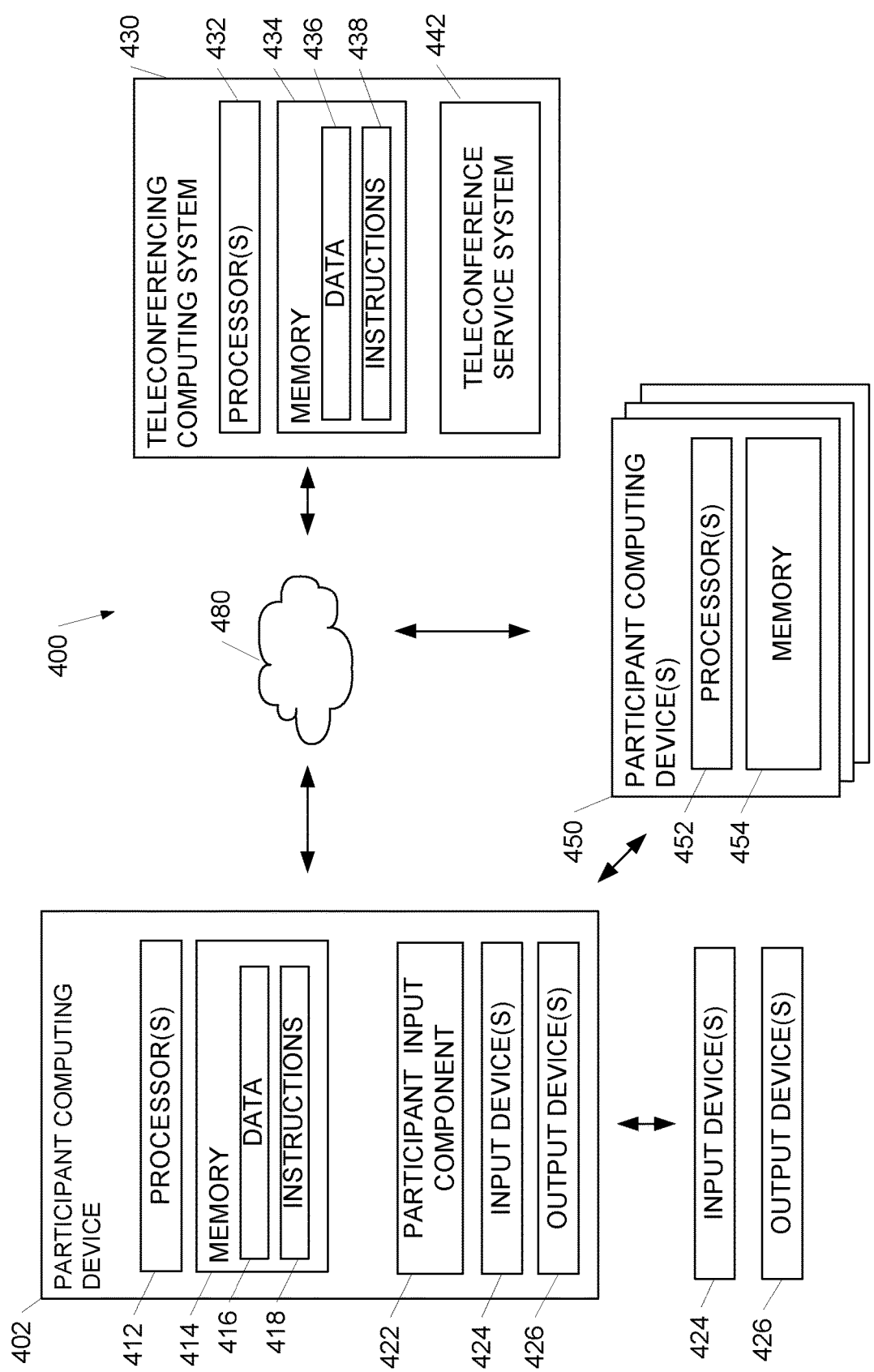
FIG. 4 depicts a block diagram of an example computing system that performs presentation of remotely accessible content to a teleconference according to example embodiments of the present disclosure.

FIG. 4 depicts a block diagram of an example computing system 400 that performs presentation of remotely accessible content to a teleconference according to example embodiments of the present disclosure. The system 400 includes various devices and systems, such as participant computing device 402, participant computing device(s) 450, teleconferencing computing system 430, etc. It should be noted that these systems and devices can implement the functionality of other systems and devices described within the present disclosure. For example, the participant computing device 402, or instances of the participant computing device 402 can be, or can otherwise implement, the presenting participant computing device 102 and the non-presenting computing device(s) 103 of FIGS. 1A and 1B. For another example, the teleconferencing computing system 430, or instances of the teleconferencing computing system 430 can be, or can otherwise implement, the teleconference computing system 110 or the remotely located system 122 of FIGS. 1A and 1B. For yet another example, the network 480, or instances of the network 180, can be, or otherwise implement, the network(s) 148 of FIGS. 1A and 1B.

The system 400 includes a participant computing device 402 that is associated with a participant in a teleconference, a teleconferencing computing system 430, and, in some implementations, one or more other participant computing devices 450 respectively associated with one or more other participants in the teleconference.

The participant computing device 402 can be any type of computing device, such as, for example, a personal computing device (e.g., laptop or desktop), a mobile computing device (e.g., smartphone or tablet), a gaming console or controller, a wearable computing device (e.g., an virtual/augmented reality device, etc.), an embedded computing device, a broadcasting computing device (e.g., a webcam, etc.), or any other type of computing device.

The participant computing device 402 includes one or more processors 412 and a memory 414. The one or more processors 412 can be any suitable processing device (e.g., a processor core, a microprocessor, an ASIC, an FPGA, a controller, a microcontroller, etc.) and can be one processor or a plurality of processors that are operatively connected. The memory 414 can include one or more non-transitory computer-readable storage media, such as RAM, ROM, EEPROM, EPROM, flash memory devices, magnetic disks, etc., and combinations thereof. The memory 414 can store data 416 and instructions 418 which are executed by the processor 412 to cause the participant computing device 402 to perform operations.

The participant computing device 402 can also include one or more participant input components 422 that receives user input. For example, the participant input component 422 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example participant input components include a microphone, a traditional keyboard, or other means by which a participant can provide user input.

The participant computing device 402 can include a teleconference participation client 419. The teleconference participation client can be the same, or substantially similar to, the teleconference participation client 108 of FIGS. 1A and 1B. For example, the participant computing device 402 may utilize the teleconference participation client 419 to generate a shared content interface (e.g., using a shared content interface generator, etc.).

In some implementations, the participant computing device 402 can include, or can be communicatively coupled, input device(s) 424. For example, the input device(s) 424 can include a camera device configured to capture two-dimensional video data of a user of the participant computing device 402 (e.g., for broadcast, etc.). In some implementations, the input device(s) 424 can include a number of camera devices communicatively coupled to the participant computing device 402 that are configured to capture image data from different poses for generation of three-dimensional representations (e.g., a representation of a user of the participant computing device 402, etc.). In some implementations, the input device(s) 424 can include audio capture devices, such as microphones. In some implementations, the input device(s) 424 can include sensor devices configured to capture sensor data indicative of movements of a user of the participant computing device 402 (e.g., accelerometer(s), Global Positioning Satellite (GPS) sensor(s), gyroscope(s), infrared sensor(s), head tracking sensor(s) such as magnetic capture system(s), an omni-directional treadmill device, sensor(s) configured to track eye movements of the user, etc.).

As a specific example, the input device(s) 424 can be or otherwise include a mouse input device that can move a cursor depicted within a shared content interface displayed by the output device(s) 426.

In some implementations, the participant computing device 402 can include, or be communicatively coupled to, output device(s) 426. Output device(s) 426 can be, or otherwise include, a device configured to output audio data, image data, video data, etc. For example, the output device(s) 426 can include a two-dimensional display device (e.g., a television, projector, smartphone display device, etc.) and a corresponding audio output device (e.g., speakers, headphones, etc.). For another example, the output device(s) 426 can include display devices for an augmented reality device or virtual reality device.

As a specific example, the output device(s) 426 can include a display for a desktop computing device that displays the shared content interface for a teleconference hosted by the teleconferencing computing system 430.

The teleconferencing computing system 430 includes one or more processors 432 and a memory 434. The one or more processors 432 can be any suitable processing device (e.g., a processor core, a microprocessor, an ASIC, an FPGA, a controller, a microcontroller, etc.) and can be one processor or a plurality of processors that are operatively connected. The memory 434 can include one or more non-transitory computer-readable storage media, such as RAM, ROM, EEPROM, EPROM, flash memory devices, magnetic disks, etc., and combinations thereof. The memory 434 can store data 436 and instructions 438 which are executed by the processor 432 to cause the teleconferencing computing system 430 to perform operations.

In some implementations, the teleconferencing computing system 430 includes or is otherwise implemented by one or more server computing devices. In instances in which the teleconferencing computing system 430 includes plural server computing devices, such server computing devices can operate according to sequential computing architectures, parallel computing architectures, or some combination thereof.

In some implementations, the teleconferencing computing system 430 can receive data of various types from the participant computing device 402 and the participant computing device(s) 450 (e.g., via the network 480, etc.). For example, in some implementations, the participant computing device 402 can capture video data, audio data, multimedia data (e.g., video data and audio data, etc.), sensor data, etc. and transmit the data to the teleconferencing computing system 430. The teleconferencing computing system 430 can receive the data (e.g., via the network 480).

In some implementations, the teleconferencing computing system 430 can receive data from the participant computing device(s) 402 and 450 according to various encryption scheme(s) (e.g., codec(s), lossy compression scheme(s), lossless compression scheme(s), etc.). For example, the participant computing device 402 can encode video data with a video codec, and then transmit the encoded video data to the teleconferencing computing system 430. The teleconferencing computing system 430 can decode the encoded video data with the video codec. In some implementations, the participant computing device 402 can dynamically select between a number of different codecs with varying degrees of loss based on conditions of the network 480, the participant computing device 402, and/or the teleconferencing computing system 430. For example, the participant computing device 402 can dynamically switch from video data transmission according to a lossy encoding scheme to video data transmission according to a lossless encoding scheme based on a signal strength between the participant computing device 402 and the network 480.

The network 480 can be any type of communications network, such as a local area network (e.g., intranet), wide area network (e.g., Internet), or some combination thereof and can include any number of wired or wireless links. In general, communication over the network 480 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

In some implementations, the teleconferencing computing system 430 can include a teleconference service system 442. The teleconference service system 442 can be configured to facilitate teleconference services for multiple participants. For example, the teleconference service system 442 can receive and broadcast data (e.g., video data, audio data, etc.) between the participant computing device 402 and participant computing device(s) 450. A teleconferencing service can be any type of application or service that receives and broadcasts data from multiple participants. For example, in some implementations, the teleconferencing service can be a videoconferencing service that receives data (e.g., audio data, video data, both audio and video data, etc.) from some participants and broadcasts the data to other participants.

As a specific example, the teleconference service system 442 can be, include, or otherwise implement the functionality of the teleconference hosting client 116 of FIGS. 1A and 1B.

As an example, the teleconference service system 442 can provide a videoconference service to multiple participants. One of the participants can transmit audio and video data to the teleconference service system 442 using a user device (e.g., a participant computing device 402, etc.). A different participant can transmit audio data to the teleconferencing service system 442 with a user device. The teleconference service system 442 can receive the data from the participants and broadcast the data to each user device of the multiple participants.

As another example, the teleconference service system 442 can implement an augmented reality (AR) or virtual reality (VR) conferencing service for multiple participants.

One of the participants can transmit AR/VR data sufficient to generate a three-dimensional representation of the participant to the teleconference service system 442 via a device (e.g., video data, audio data, sensor data indicative of a pose and/or movement of a participant, etc.). The teleconference service system 442 can transmit the AR/VR data to devices of the other participants. In such fashion, the teleconference service system 442 can facilitate any type or manner of teleconferencing services to multiple participants.

It should be noted that the teleconference service system 442 can facilitate the flow of data between participants (e.g., participant computing device 402, participant computing device(s) 450, etc.) in any manner that is sufficient to implement the teleconference service. In some implementations, the teleconference service system 442 can be configured to receive data from participants, decode the data, encode the data, broadcast the data to other participants, etc. For example, the teleconference service system 442 can receive encoded video data from the participant computing device 402. The teleconference service system 442 can decode the video data according to a video codec utilized by the participant computing device 402. The teleconference service system 442 can encode the video data with a video codec and broadcast the data to participant computing devices.

Additionally, or alternatively, in some implementations, the teleconference service system 442 can facilitate peer-to-peer teleconferencing services between participants. For example, in some implementations, the teleconference service system 442 can dynamically switch between provision of server-side teleconference services and facilitation of peer-to-peer teleconference services based on various factors (e.g., network load, processing load, requested quality, etc.).

The participant computing device 402 can receive data broadcast from the teleconference service system 442 of teleconferencing computing system 430 as part of a teleconferencing service (video data, audio data, etc.). In some implementations, the participant computing device 402 can upscale or downscale the data (e.g., video data) based on a role associated with the data. For example, the data can be video data can be associated with a participant of the participant computing device 402 that is assigned an active speaker role. The participant computing device 402 can upscale the video data associated with the participant in the active speaker role for display in a high-resolution display region (e.g., a region of the output device(s) 426). For another example, the video data can be associated with a participant with a non-speaker role. The participant computing device 402 can downscale the video data associated with the participant in the non-speaker role using a downscaling algorithm (e.g., lanczos filtering, Spline filtering, bilinear interpolation, bicubic interpolation, etc.) for display in a low-resolution display region. In some implementations, the roles of participants associated with video data can be signaled to computing devices (e.g., participant computing device 402, participant computing device(s) 450, etc.) by the teleconference service system 442 of the teleconferencing computing system 430.

The teleconferencing computing system 430 and the participant computing device 402 can communicate with the participant computing device(s) 450 via the network 480. The participant computing device(s) 450 can be any type of computing device(s), such as, for example, a personal computing device (e.g., laptop or desktop), a mobile computing device (e.g., smartphone or tablet), a gaming console or controller, a wearable computing device (e.g., an virtual/ augmented reality device, etc.), an embedded computing device, a broadcasting computing device (e.g., a webcam, etc.), or any other type of computing device.

The participant computing device(s) 450 includes one or more processors 452 and a memory 454 as described with regards to the participant computing device 402. In some implementations, the participant computing device(s) 450 can be substantially similar to, or identical to, the participant computing device 402. Alternatively, in some implementations, the participant computing device(s) 450 can be different devices than the participant computing device 402 that can also facilitate teleconferencing with the teleconference computing system 430. For example, the participant computing device 402 can be a laptop and the participant computing device(s) 450 can be smartphone(s).

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for increasing teleconferencing bandwidth efficiency via presentation of remotely accessible content, the method comprising:
   receiving, by a computing system comprising one or more computing devices, a request to present content to a teleconference from a presenting participant device of the teleconference, wherein the content comprises a particular file type;
   for each of one or more non-presenting participant devices of the teleconference, determining, by the computing system, that the content is presentable based on at least one criterion, wherein the at least one criterion comprises one or more of:
   (a) the particular file type; or
   (b) an available bandwidth of the non-presenting participant device;
   generating, by the computing system, a unit of software instructions that is configured to cause a participant device to:
   receive content access credentials for the content, wherein access to the content is restricted to participant devices with the content access credentials;
   access the content from an originating location that differs from the presenting participant device using the content access credentials, wherein the computing system comprises the originating location that differs from the presenting participant device, and wherein the content comprises an application of the computer system; and display the content within a shared content interface of the teleconference, wherein the shared content interface is configured to display a view of the content that is consistent between each participant device of the teleconference;

providing, by the computing system, the unit of software instructions to the one or more non-presenting participant devices of the teleconference;

receiving, by the computing system from the presenting participant device, a request to stop presenting the content to the teleconference; and responsive to receiving the request to stop presenting the content, revoking, by the computing system content access credentials from each of the one or more non-presenting participant devices.

2. The computer-implemented method of claim 1, wherein providing the unit of software instructions to the one or more non-presenting participant devices further comprises providing, by the computing system, interaction information for the presenting participant device to the one or more non-presenting participant devices, wherein the interaction information is descriptive of a participant input to the shared content interface received at the presenting participant device.

3. The computer-implemented method of claim 2, wherein the participant input to the shared content interface comprises an input from an input device of the presenting participant device that moves a cursor located within the shared content interface displayed by the presenting participant device.

4. The computer-implemented method of claim 3, wherein the interaction information for the presenting participant device comprises a second unit of software instructions that is configured to cause a participant device to depict the participant input within the shared content interface.

5. The computer-implemented method of claim 2, wherein the participant input to the shared content interface comprises an input from an input device of the non-presenting participant device that moves a cursor located within the shared content interface at the non-presenting participant device.

6. The computer-implemented method of claim 1, wherein the content comprises a web page that comprises a navigational element configured to navigate to a second web page; and wherein the method further comprises:
receiving, by the computing system, interaction information for a non-presenting participant device of the one or more non-presenting participant devices, wherein the interaction information is descriptive of a participant input within the shared content interface received at the non-presenting participant device that selects the navigational element; and
providing, by the computing system, the interaction information for the non-presenting participant device to the presenting participant device.

7. The computer-implemented method of claim 6, wherein a portion of the shared content interface comprises a web browser, and wherein the content is accessed via the web browser.

8. The computer-implemented method of claim 7, wherein the interaction information for the non-presenting participant device of the one or more non-presenting participant devices comprises a third unit of software instructions that is configured to cause a participant device to navigate from the web page to the second web page within the web browser of the shared content interface at the participant device.

9. The computer-implemented method of claim 8, wherein the one or more non-presenting participant devices comprises a plurality of non-presenting participant devices; and wherein providing the interaction information for the non-presenting participant device to the presenting participant device further comprises providing, by the computing system, the interaction information for the non-presenting participant device to one or more other non-presenting participant devices of the plurality of non-presenting participant devices.

10. The computer-implemented method of claim 7, wherein the computing system comprises the presenting participant device, and wherein providing the interaction information for the non-presenting participant device to the presenting participant device comprises:

causing, by the computing system, the participant computing device to navigate from the web page to the second web page within the shared content interface of the teleconference.

11. The computer-implemented method of claim 1, wherein the method further comprises:
receiving, by the computing system, interaction information descriptive of a participant input to an instance of the application executed at the presenting participant device; and
providing, by the computing system, the interaction information to the one or more non-presenting participant devices.

12. The computer-implemented method of claim 11, wherein the interaction information comprises a unit of software instructions that is configured to cause a participant device to perform the input to an instance of the application executed at the participant device.

13. The computer-implemented method of claim 1, wherein the content access credentials are configured to expire after a period of time.

14. The computer-implemented method of claim 1, wherein the at least one criterion further comprises one or more of:
a location of the originating location that differs from the presenting participant device;
a content type of the content;
a size of the content;
security characteristics of the content; or
content access capabilities of the one or more non-presenting participant devices.

15. A computing system, comprising:
one or more processors;
one or more non-transitory computer-readable media that store instructions that, when executed by the one or more processors of the computing system, cause the computing system to perform operations, the operations comprising:
receiving a request to present content to a teleconference from a presenting participant device of the teleconference, wherein access to the content is restricted to participant devices with content access credentials, wherein the content comprises an application of the computing system;

for each of one or more non-presenting participant devices of the teleconference, determining that the content is presentable based on at least one criterion, wherein the at least one criterion comprises one or more of:
  (a) the particular file type; or
  (b) an available bandwidth of the non-presenting participant device;
generating a unit of software instructions that is configured to cause a participant device to:
  access the content from an originating location that differs from the presenting participant device; and
  display the content within a shared content interface of the teleconference, wherein the shared content interface is configured to display a view of the content that is consistent between each participant device of the teleconference;
providing, to each of one or more non-presenting participant devices of the teleconference, data that comprises interaction information, the unit of software instructions, and the content access credentials for the content, wherein the interaction information is descriptive of a participant input to the shared content interface received at the presenting participant device;
receiving, from the presenting participant device, a request to stop presenting the content to the teleconference; and
responsive to receiving the request to stop presenting the content, revoking the content access credentials from each of the one or more non-presenting participant devices.

* * * * *